United States Patent

[11] 3,538,854

| [72] | Inventors | Ronald Oranczak<br>Easton;<br>Charles E. Jacoby, Bethlehem, 0; Allen R.<br>Lewis, Easton, Pennsylvania 0 |
|---|---|---|
| [21] | Appl. No. | 733,460 |
| [22] | Filed | May 31, 1968 |
| [45] | Patented | Nov. 10, 1970 |
| [73] | Assignee | SI Handling Systems, Inc.,<br>Easton, Pennsylvania<br>a corporation of Pennsylvania |

[54] TOW LINE CONVEYOR
11 Claims, 11 Drawing Figs.

[52] U.S. Cl. .................................................. 104/147,
104/173, 104/178
[51] Int. Cl. ........................................... B65g 35/06,
B65g 23/42
[50] Field of Search ............................................ 104/147,
173, 172, 162, 165, 202, 214, 215, 178; 198/218,
221

[56] References Cited
UNITED STATES PATENTS
| 704,830 | 7/1902 | Jackman |
| 2,362,208 | 11/1944 | Langen |
| 3,208,401 | 9/1965 | Freeman |

Primary Examiner—Arthur L. La Point
Assistant Examiner—Robert Saifer
Attorney—Seidel and Gonda ABSTRACT: A tow line conveyor is disclosed which uses a pair of reciprocating cables having pusher dogs thereon instead of an endless conveyor chain. The cable pusher dogs are spaced apart so that a tow pin on a vehicle may be smoothly transferred from the dog on one cable to the adjacent dog on the other cable as the cables reciprocate in opposite directions.

Patented Nov. 10, 1970

INVENTORS
RONALD ORANCZAK
CHARLES E. JACOBY
ALLEN R. LEWIS

BY Seidel & Gonda
ATTORNEYS

Patented Nov. 10, 1970

INVENTORS
RONALD ORANCZAK
CHARLES E. JACOBY
ALLEN R. LEWIS

BY Seidel & Gonda

ATTORNEYS

TOW LINE CONVEYOR

Heretofore, conveyors for pushing a vehicle tow pin along a guide slot of a tow line system have been chains comprised of pivotable links and pusher dogs. The tow line conveyor of the present invention utilizes a pair of reciprocating cables instead of conveyor chain. Cable is commercially available at prices which are about one-tenth the price of conveyor chains. Hence, the conveyor of the present invention is substantially cheaper to construct and maintain than those utilized heretofore.

In accordance with the present invention, first and second cables are reciprocated in opposite directions below a guide slot. Pusher dogs are attached to each cable at spaced locations so that the paths of adjacent dogs overlap. The vehicle to be moved along the guide slot will have its tow pin extending into the slot. The tow pin will be pushed by a dog on the first cable, then it will be transferred to the adjacent dog of the second cable. After the dog of the second cable has moved in the desired direction of travel for its entire path, the tow pin will be transferred back to another dog of the first cable. Such transferring is accomplished smoothly. This process is repeated until the vehicle has moved the desired distance along the guide slot.

It is an object of the present invention to provide novel apparatus and method for moving a vehicle along a guide slot of a tow line conveyor system.

It is another object of the present invention to provide a novel tow line conveyor apparatus and method which is simple, reliable, easy to maintain, and inexpensive.

It is another object of the present invention to provide a tow line conveyor which does not require expensive conveyor chains.

It is another object of the present invention to provide a novel tow line conveyor pusher dog.

It is another object of the present invention to provide a tow line conveyor which operates smoothly without any special equipment and which has an infinite variety of speeds.

Other objects will appear hereinafter.

FIG. 5 is a sectional view taken along the line 5–5 in FIG. 1.

FIG. 6 is a sectional view taken along the line 6–6 in FIG. 5.

FIGS. 7–11 diagrammatically illustrate the sequence of method steps in transferring the tow pin from the pusher dogs on one cable to the pusher dogs on the other cable.

Figure 1:
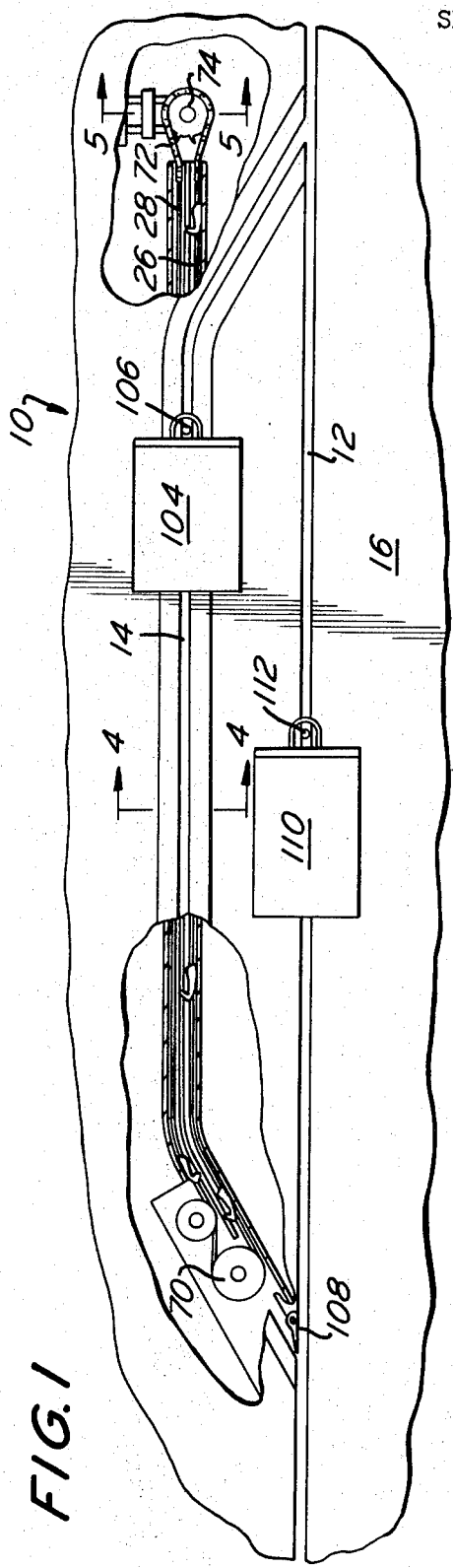
FIG. 1 is a partial top plan view of a tow line conveyor system in accordance with the present invention.
Figure 2:
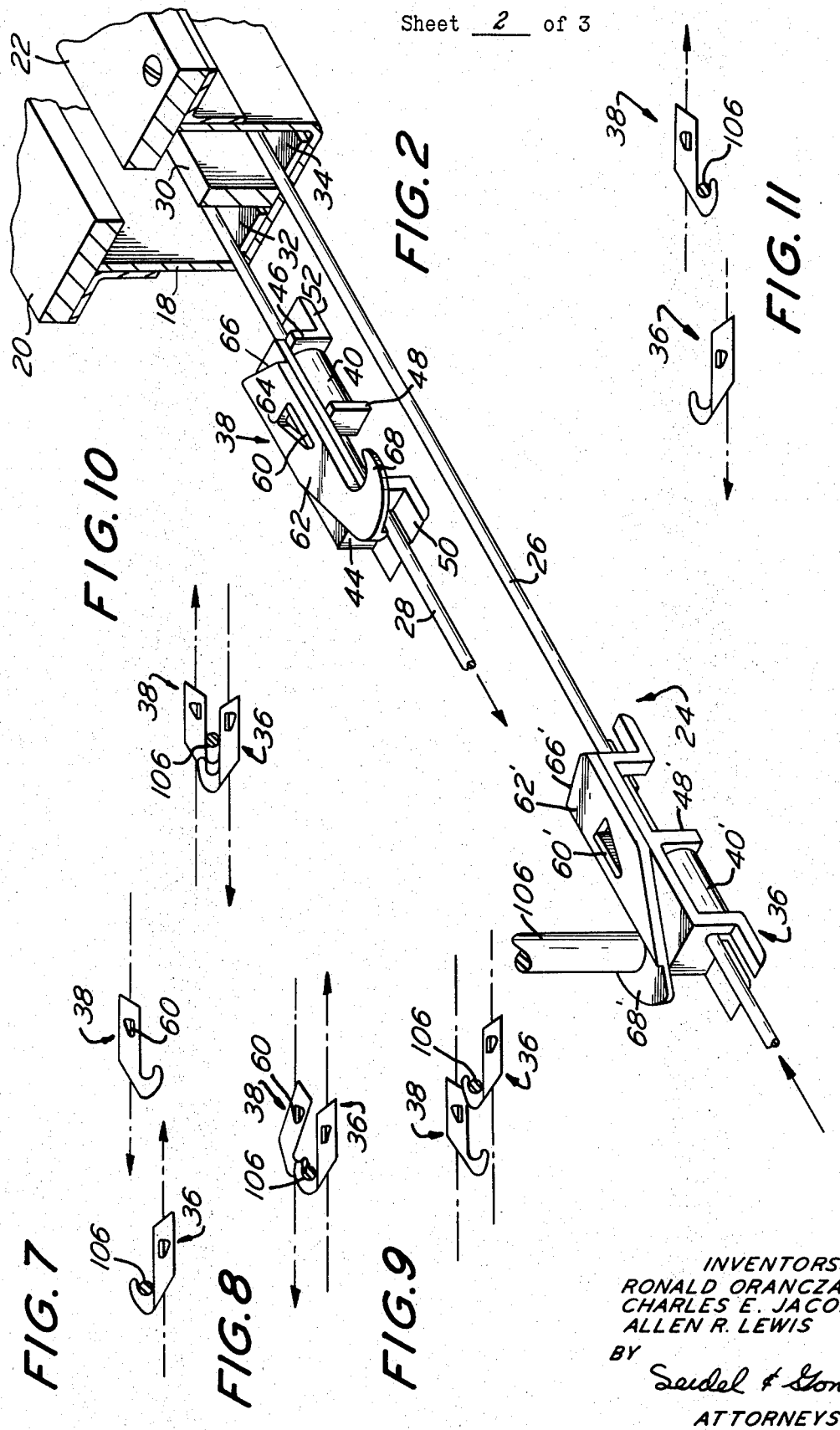
FIG. 2 is a partial perspective view of the tow line conveyor of the present invention.
Figure 4:
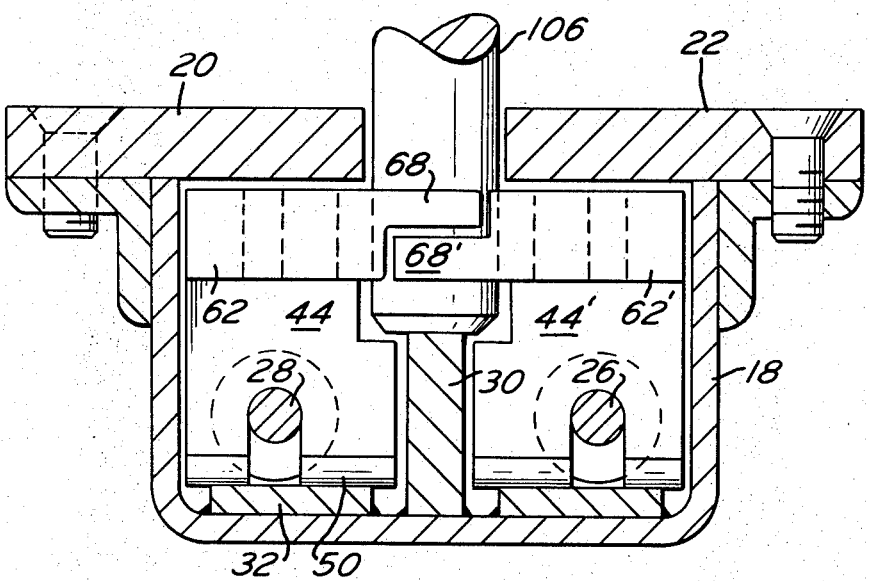
FIG. 4 is a sectional view taken along the line 4–4 in FIG. 1.

Referring to the drawing in detail, wherein like numerals indicate like elements, there is shown in FIG. 1 a partial perspective view of a tow line conveyor system including the tow line conveyor of the present invention designated generally as 10. The system includes a main slot 12 and a transfer or shunt slot 14 which intersects the main slot. The slots 12 and 14 are in a reference surface such as the floor 16. As shown more clearly in FIGS. 2 and 4, the slot 14 is defined by a pair of spaced cover plates 20 and 22 mounted on top of a U-shaped housing 18. Plates 20 and 22 are flush with the floor level.

The tow line conveyor is designated generally as 24 and includes a first cable 26 and a second cable 28. As will be explained hereinafter, the cables reciprocate in opposite directions. The cables are parallel to one another and are disposed within the housing 18 on opposite sides of the center rail 30. A wear plate 32 is positioned within housing 18 on one side of the rail 30 and a similar wear plate 34 is provided on the opposite side of the rail 30.

Pusher dogs 36 are removably secured to cable 26 at spaced points therealong. Pusher dogs 38 are removably secured to cable 28 at spaced points therealong. The pusher dogs are identical except as will be made clear hereinafter to indicate that they are of opposite hand. Hence, only pusher dog 38 will be described in detail with corresponding primed numerals being applied to the pusher dog 36.

Figure 3:
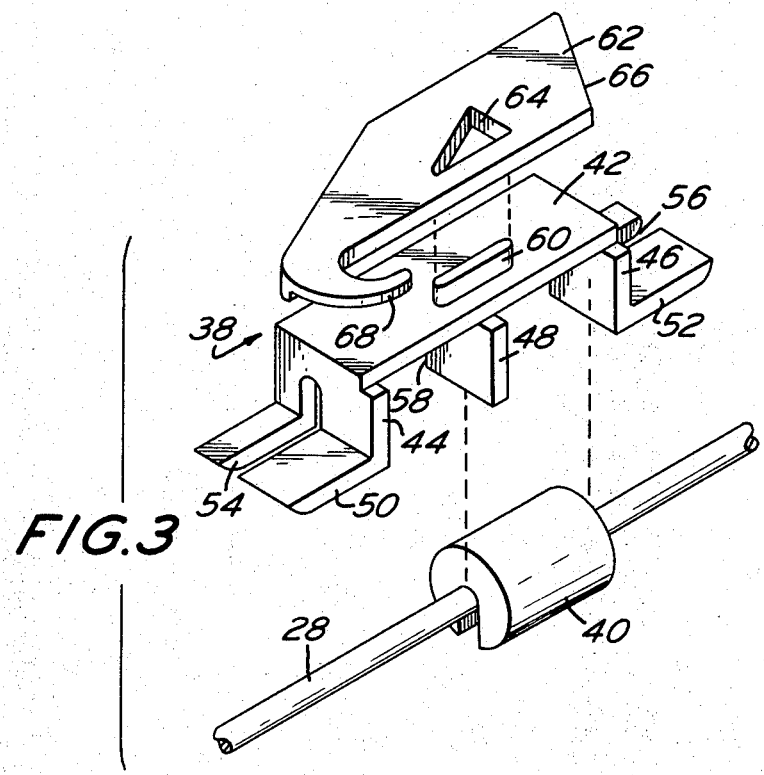
FIG. 3 is an exploded view of a pusher dog and an associated portion of the cable.

As shown more clearly in FIG. 3, the pusher dog 38 is removably connected to the cable 28 by means of a button 40. The button 40 is swaged onto the cable 28. The pusher dog 38 includes a saddle having a top wall 42, end walls 44 and 46, and a center wall 48. The saddle is telescoped over the button so that the button is disposed between walls 46 and 48 as shown more clearly in FIG. 2.

A shoe 50 extends from end wall 44. A similar shoe 52 extends from end wall 46. The shoes 50 and 52 ride on the wear plate 32. A slot 54 is provided in shoe 50 and end wall 44. A slot 56 is provided in shoe 52 and end wall 46. A slot 58 is provided in center wall 48 and is aligned with the slots 54 and 56. These slots accommodate the cable 28.

An elongated pin 60 is integral with the top plate 42 on the saddle of pusher dog 38. Pin 60 extends in a direction parallel to cable 28. A puller 62 is provided with a triangular hole 64. Puller 62 has a cam surface 66 at one end and a hook 68 at the other end.

It will be noted that the hook 68 is of reduced thickness as compared with the remainder of the puller 62 by removing a portion of its lower surface. Puller 62' has its hook 68' of reduced thickness by removing a portion of its top surface. Hence, the hooks 68 and 68' may be disposed one above the other when the pullers pass each other, as shown more clearly in FIG. 4.

The hole 64 is of triangular configuration with rounded corners. The pin 60 cooperates with the hole 64 so that the puller 62 may have one position wherein its side face is parallel to the cable 28 and another position wherein its side face is at an angle of about 20° with respect to the cable 28. The purpose and manner for such pivotable movement of the puller with respect to its cable will be described in greater detail hereinafter.

The ends of cables 26 and 28 may be interconnected in any convenient manner and extend around a pulley or sprocket 70. The other ends of the cables 26 and 28 are preferably interconnected by a short length of chain 72. Chain 72 has a length of about four feet. Chain 72 extends around a sprocket 74 mounted on shaft 76.

As shown more clearly in FIGS. 5 and 6, the shaft 76 is mounted in bearings in a housing 78. Housing 78 has a chamber 80 constituting approximately 280 arcuate degrees. Shaft 76 is pivotably secured to hub 84 in chamber 80. A paddle 82 is integral with hub 84 and adapted to rotate from one end of the chamber 80 to the other.

A wall portion 86 occupies the remaining 80 arcuate degrees of the cylindrical housing 78. A flow passage 88 is provided in portion 86 and communicates with one end of the chamber 80. A similar passage 90 is provided in portion 86 for communication with the other end of chamber 80. Passage 88 communicates with valve 96 by way of conduit 92. Passage 90 communicates with valve 96 by way of conduit 94.

Valve 96 may be any commercially available four-way supply and exhaust valve. valve 96 is in communication with the outlet side of a pump 102 by way of conduit 98 and also communicates with a sump for the pump 102 by way of conduit 100. Valve 96 is sequentially operated so that it alternately places conduit 92 and conduit 94 in communication with conduit 98 or conduit 100. Hence, when fluid is entering chamber 80 by way of passage 88, a hydraulic fluid is being pushed out of chamber 80 by the paddle 82 through passage 90.

The structure shown in FIGS. 5 and 6 constitutes a hydraulic means for smoothly reciprocating the cables 26 and 28 in alternate directions with smooth transition from one direction to another and without any surges. By using a variable speed pump, an infinite variety of speeds may be attained for the reciprocation of the cables 26 and 28. If desired, a clutch may be provided as a part of shaft 76 so that the hydraulic means will stall when overloaded. Smooth acceleration and deceleration of the cables 26 and 28 are desired so as to facilitate a smooth transfer from the dogs on one cable to the dogs on the other cable.

As shown more clearly in FIG. 1, there is illustrated a vehicle 104 being pulled along the slot 14 by the conveyor 10. Vehicle 104 has a tow pin 106 extending downwardly through the slot 14 until it contacts the upper surface of center rail 30. The intersection of slots 12 and 14 at the lefthand end of FIG. 1 may be controlled by a diverter 108. A wide variety of devices are known for actuating the diverter 108 when it is desired to cause a vehicle such as vehicle 104 to transfer from movement along slot 12 to movement along slot 14. A conveyor, not shown, is provided below slot 12 to move vehicles such as vehicle 110 therealong. Vehicle 110 likewise has a tow pin 112 which extends through the slot 12 for contact with a conveyor.

The operation of the conveyor 10 is as follows:

It will be assumed that vehicle 104 has been transferred from movement along slot 12 to movement along slot 14 by operation of diverter 108. The momentum on the vehicle will cause it to enter the area of the cables 26 and 28. It will be assumed that the hydraulic motor is operating so as to sequentially oscillate the sprocket 74 and thereby reciprocate the cables 26 and 28. The extent of the reciprocatory stroke of the cables is defined by the diameter of sprocket 74. Using a sprocket having a diameter of approximately 14 inches, the stroke of the cables will be approximately 32 inches. The pusher dogs 36 and 38 are located along their respective cables so that their strokes will overlap one another.

Referring to FIG. 7, the pusher dog 36 is moving to the right and its hook has engaged the tow pin 106. At the same time, the pusher dog 38 is moved to the left. As shown in FIG. 8, the cam surface defined by the curved portion of the hook 68 engages the tow pin 106 and causes the puller 62 to rotate through an arc of about 20° until the hook 68 passes by the tow pin 106. As soon as the dogs are about midway in passing one another, the tow pin 106 engages the side face of the puller 60 and straightens out the same as shown more clearly in FIG. 9. The extent of overlap of the strokes for the dogs 36 and 38 is illustrated in FIG. 9.

Immediately after the dogs 36 and 38 reach the position shown in FIG. 9, dog 36 will start to reciprocate back to the left as shown more clearly in FIG. 10 and dog 38 will begin to reciprocate to the right. In doing so, dog 36 loses contact with the tow pin 106 and the hook on dog 38 makes contact with the tow pin 106. The hooks on the dogs 36 and 38 do not interfere with one another because of the reduced thickness in their overlapping portions as shown more clearly in FIG. 4. Thereafter, dog 38 continues to the right in FIG. 11 and dog 36 continues to the left in FIG. 11. The transition from dog 36 to dog 38 is accomplished smoothly without any surges in the line and the tow pin 106 is out of contact with both dogs for a short length of travel of about 2 inches. During the time when the tow pin 106 is out of contact with both of the dogs, the momentum of the vehicle keeps it moving in the desired direction of travel. The above process is repeated until the vehicle has traveled along the entire length of the slot 14. When slot 14 is a transfer slot, the vehicle may again reenter the main slot 12 and will continue to move along slot 12 as soon as the tow pin 106 is contacted by a dog on the conveyor below slot 12. If slot 14 is utilized as a shunt slot, a limit stop will be provided to determine the storage area or a cam may be provided on rail 30 to cam the tow pin 106 upwardly out of contact with the pusher dogs on the cables.

The cables are always in tension and therefore less likely to malfunction. The hydraulic device provides a means for oscillating the cables at constant velocity. Since the pusher dogs are removably coupled to their respective cables, the dogs may be removed at any desired location along the cables so as to define an area wherein the vehicles will stop to facilitate loading or unloading of the vehicles. It will be noted that the conveyor 10 does not include any bolts, screws or other fasteners. The dogs 36 and 38 reciprocate on the wear plates disposed within the housing 18 and the upper limit of the dogs is defined by the lower surface on the cover plates 20 and 22.

Anytime the puller on any of the dogs is skewed, such as the illustrated position of puller 62 in FIG. 8, it will automatically be straightened out by contact with the tow pin. When first making contact with tow pin 106, puller 62' is pivoted due to contact between tow pin 106 and the cam surface defined by the arcuate hook 68'. The contact between tow pin 106 and the side face of puller 62' causes the latter to straighten out.

If a side face of a puller is worn so that the puller does not straighten before the end of its stroke, cam surface 64 will contact the tow pin 106 on the return stroke and straighten out the puller 62 so that the hook 68 may engage the tow pin. It should be apparent that each dog in either set has a stroke which overlaps the stroke of the tow adjacent dogs of the opposite set. The dogs on cables 26 or 28 may be referred to as a set of dogs.

The present invention may be embodied in other specific forms without departing from the spirit or essential attributes thereof and, accordingly, reference should be made to the appended claims, rather than to the foregoing specification as indicating the scope of the invention.

We claim:

1. A method of pushing a vehicle having a tow pin extending into a guide slot comprising the steps of providing first and second sets of reciprocating dogs of opposite hand below the slot, reciprocating the sets in opposite directions, pushing the tow pin by contacting it with a first dog of the first set, transferring the tow pin from the first dog to a dog of the second set after the first dog has reciprocated for a specified stroke along the slot, pushing the tow pin by contact between the tow pin and the dog of the second set, and then transferring the tow pin from contact with the dog of the second set to contact with another dog of the first set.

2. A method in accordance with claim 1 wherein said step of reciprocating the sets of dogs includes providing reciprocating cables to which the dogs are coupled, interconnecting the ends of the cables, and coupling the interconnection portion between the cables to an oscillating rotating member.

3. A method in accordance with claim 1 wherein said step of reciprocating the sets of dogs in opposite directions includes reciprocating the dogs so that adjacent dogs of the respective sets have overlapping strokes, and camming the dogs of one set out of the way of the dog contracting the tow pin when dogs of said sets pass each other at the overlapping part of their strokes.

4. A tow line conveyor comprising first and second cables below a guide slot, dogs at spaced points along the cables, the dogs on the first cable being of opposite hand with respect to the dogs on the second cable, each dog including a puller having a hook and being pivotable about a vertical axis, means coupled to said cables for reciprocating said cables in opposite directions, and said dogs being located on their cables so that a dog on the first cable has a stroke which overlaps the stroke of the adjacent dogs on the second cable.

5. A conveyor in accordance with claim 4 including an elongated housing, said cables being disposed within said housing and separated from one another by a center rail, said center rail being aligned with said slot.

6. A conveyor in accordance with claim 4 wherein said means includes a sprocket, said sprocket being coupled to a short length of chain, said chain having its ends secured to said cables, and hydraulic means for oscillating said sprocket.

7. A conveyor in accordance with claim 4 wherein said dogs are removably coupled to their respective cables by buttons, each button being fixedly secured to a cable, and spaced walls on each dog embracing opposite end portions of a button.

8. A conveyor in accordance with claim 4 wherein said dogs include a saddle, each saddle having an elongated pin, each puller having a triangular hole into which the pin extends, with the hooks being of reduced thickness so that the hooks on the first and second cables may overlap one another when the dogs on the cables pass each other.

9. A subcombination of a pusher dog for use in a tow line conveyor comprising a saddle, a puller pivotably supported on said saddle for pivotable movement about a vertical axis, one end of said puller having a hook, the hook being of lesser thickness than the remainder of the puller, and said hook being to one side of said saddle for engagement with a tow pin.

10. Apparatus in accordance with claim 9 wherein said saddle has an elongated pin extending into a generally triangular hole in said puller to permit said puller to have limited pivotable movement with respect to said saddle, and said saddle having a hole therethrough so that a cable may extend through the saddle.

11. An apparatus including a cable and a pusher dog mounted on said cable, said pusher dog comprising a saddle, a puller pivotally supported on said saddle for pivotal movement about a vertical axis, one end of said puller having a hook, the hook being of lesser thickness than the remainder of the puller, said hook being to one side of said saddle for engagement with a tow pin, a button fixedly secured to the cable, and said saddle embracing opposite ends of the button so as to be removably coupled to the cable and movable with the cable.